United States Patent [19]

Danko et al.

[11] 4,323,803

[45] Apr. 6, 1982

[54] ELECTRIC MACHINE

[76] Inventors: Vladimir G. Danko, bulvar Ivana, Karkacha, 2, kv. 89; Boris I. Ljuty, ulitsa Mira, 62, kv. 26; Alexandr A. Chigirinsky, ulitsa Kuibysheva 11, kv. 8; Vasily S. Kildishev, ulitsa Plekhanovskaya 41/43, kv. 55; Viktor V. Kuzmin, prospekt Gagarina, 92, kv. 43, all of, Kharkov; Yanush B. Danilevich, ulitsa Tipanova 29, kv. 681; Lidia I. Chubraeva, ulitsa Bestuzhevskaya, 34, kv. 55, both of Leningrad; Konstantin F. Potekhin, ulitsa Stanislavskogo, 11, kv. 186, Novosibirsk; Konstantin N. Maslennikov, ulitsa Petukhova, 138, kv. 87, Novosibirsk; Valery K. Ivanov, ulitsa Zorge, 68, kv. 20, Novosibirsk, all of U.S.S.R.

[21] Appl. No.: 135,324

[22] Filed: Mar. 31, 1980

[30] Foreign Application Priority Data

Jun. 5, 1978 [SU] U.S.S.R. .............................. 2624805

[51] Int. Cl.³ .............................................. H02K 9/00
[52] U.S. Cl. ........................................ 310/59; 310/64; 310/86; 165/104.19; 165/104.32
[58] Field of Search .................. 310/52, 86, 53, 54, 310/55, 56, 57, 58, 59, 60, 60 A, 64, 65; 165/106

[56] References Cited

U.S. PATENT DOCUMENTS

| 2,722,616 | 11/1955 | Moses | 310/64 |
| 2,727,161 | 12/1955 | Kilner | 310/64 |
| 2,873,393 | 2/1959 | Baudry | 310/55 |
| 2,900,538 | 8/1959 | Tudge | 310/64 |
| 2,917,644 | 12/1959 | Laffoon | 310/64 |
| 3,252,309 | 5/1966 | Maestrelli | 165/106 |
| 3,530,320 | 9/1970 | Davidson | 310/52 |
| 3,634,705 | 1/1972 | Fidel | 310/65 |
| 4,139,057 | 2/1979 | Klaar | 310/64 |

*Primary Examiner*—R. Skudy
*Attorney, Agent, or Firm*—Robert E. Burns; Emmanuel J. Lobato; Bruce L. Adams

[57] ABSTRACT

The electric machine comprises a rotor, a stator filled with a cooling fluid and separated from the rotor by a sealed jacket forming chambers of end-connectors of the stator winding. Within the stator there are provided ducts for the cooling fluid to flow therein, which connect said chambers. An external pipeline, at least part of which is disposed above the stator, forms an ascending and descending branches of the cooling fluid circulation system, each of the branches being communicated with one of said chambers. The upper section of the descending branch includes a cooler which is thus comprised in the whole system of the cooling fluid natural circulation which is effected due to the difference in specific weights of heated and cooled fluid.

3 Claims, 1 Drawing Figure

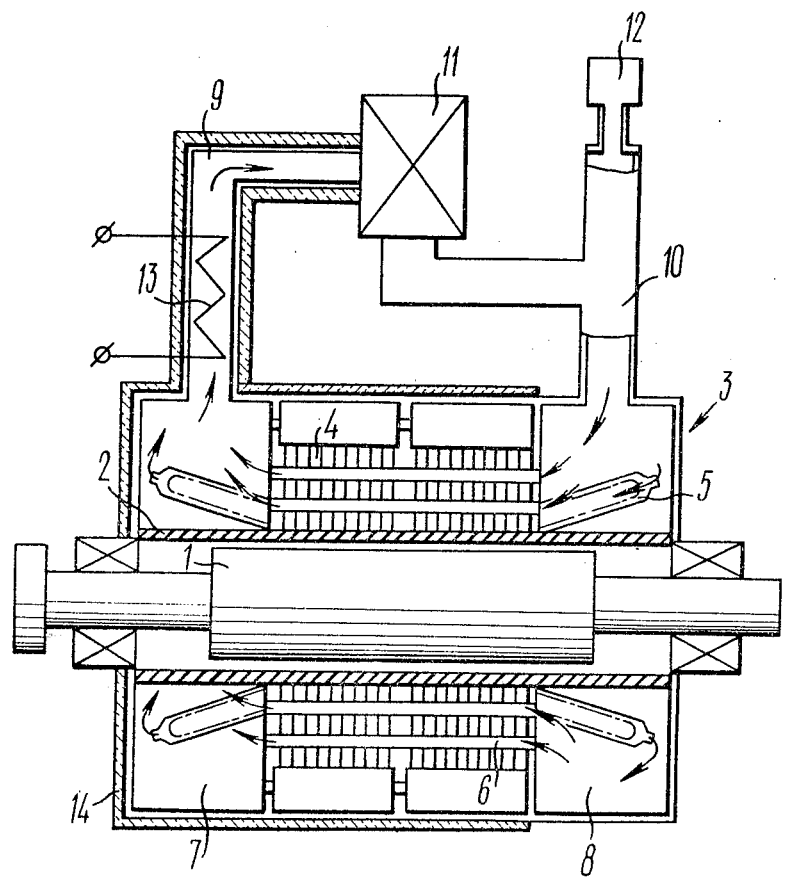

ELECTRIC MACHINE

FIELD OF THE INVENTION

The present invention relates to manufacturing electric machines wherein cooling is effected by a fluid, and more particularly to an electric machine with a cooled stator.

The invention can be employed mainly in manufacturing large electric machines, for instance, turbogenerators.

BACKGROUND OF THE INVENTION

Known in the art are electric machines with the stator core and winding directly cooled by a fluid coolant (cf. V.V. Titov and other. "Turbogeneratory. Raschet i Konstruktsia." M., "Energia," 1967, p. 200), wherein the fluid coolant circulates within the ducts made formed in individual elements such as tubes, segments, etc., located inside the radial or axial ducts of the stator core and winding. The structure of the cooling units in these machines is rather complicated and, as a result of many junctions employed, is unreliable. A supercharger (a pump, a compressor, etc.) is an obligatory element in the cooling medium circulation system.

Also known in the art is an electric machine (cf. U.S. Pat. No. 3,530,320), comprising a rotor, a stator separated from the former by a sealed jacket which forms closed chambers of the stator winding end-connectors, communicating with each other through ducts of a complicated configuration, having, in turn, radial and axial sections, and also through an external pipeline intended for a cooling medium to circulate within the stator. The external pipeline incorporates a cooler and a supercharger (a pump or a fan). To effect forced circulation of the cooling medium, the supercharger consumes a certain amount of electric energy, thereby reducing the electric machine efficiency. In addition, the employment of devices with movable parts and units considerably reduces the operating reliability of the electric machine.

SUMMARY OF THE INVENTION

The principal object of the invention consists in providing an electric machine wherein the energy of heat loss in the stator active parts is used for cooling the stator.

Another object of the invention consists in decreasing power consumption for cooling the stator.

It is also an object of the invention to increase the efficiency of the electric machine.

Still another object of the invention consists in increasing the reliability of the cooling means of the electric machine, and also in facilitating its service.

These and other objects of the invention are accomplished by that in an electric machine, comprising a rotor, a stator having ducts for a cooling medium to flow therein, a sealed jacket separating the stator from the rotor and forming chambers of the stator winding end-connectors, communicated with each other through said ducts in the stator and also through an external pipeline intended for a cooling medium to circulate within the stator and connected with a cooler, according to the invention, at least part of the external pipeline is disposed above the stator, forming an ascending branch and a descending branch of the circulation system, the cooler being included in the upper portion of the descending branch, with a fluid being used as the cooling medium.

It is expedient that a heater be included in the ascending branch of the circulation system to speed up a directed circulation when the machine is started.

It is advisable that the heater be disposed in the lower part of the ascending branch of the circulation system, in the immediate proximity of the stator. In this case the effect of the heater on the cooling medium circulation is increased.

With the same end in view, it is expedient that at least part of the circulation system ascending branch and the adjacent part of the stator be provided with thermal insulation.

The above embodiment of the electric machine makes it possible to manage without a supercharger in the cooling fluid circulation system due to using the energy of heat loss in the stator active parts, causing circulation of the cooling fluid due to the difference of specific weights of the heated and cooled fluid. As a result, power consumption for cooling the stator is decreased, and the electric machine efficiency increased.

BRIEF DESCRIPTION OF THE DRAWING

The nature of the invention will become clearer from a detailed description of its specific embodiments made with reference to the accompanying drawing which shows a cross-section view of the electric machine wherein cooling of the stator is effected according to the invention.

DESCRIPTION OF THE PREFERRED EMBODIMENTS

The proposed electric machine comprises a rotor 1, separated by a sealed jacket 2 from a stator 3. Cooling of the rotor 1 and the stator 3 is effected independently and can be carried out by using a method known in the art and suitable for the present case. Therefore, the cooling system for the rotor 1 is not shown in the drawing.

In the preferred embodiment of the invention, the sealed jacket 2 is made in the form of a cylinder disposed in the annular gap between the rotar 1 and the stator 3, and extending over the whole length of the stator 3 body.

The stator 3 has a core 4 and a bar winding whose end-connectors 5 are shown in the drawing. In the core 4, in the bars of the winding and in the end-connectors 5 thereof there are provided ducts 6 to enable the cooling fluid to flow therein.

To decrease hydraulic resistance, it is most expedient that the ducts be axial. According to the drawing, the sealed jacket 2 forms chambers 7 and 8 of the end-connectors 5 of the stator 3 winding, said chambers being annular in form and defined by the body of the stator 3, butt end panels, the sealed jacket 2, and the tail piece of the core 4 of the stator 3. The chambers 7 and 8 communicate with each other through the ducts 6 and an external pipeline at least part of which is disposed above the stator 3. The external pipeline is intended for the cooling fluid to circulate, and represents a portion of the circulation path formed by the chambers 7 and 8 of the stator winding end-connectors, the ducts 6, the ascending branch 9 and the descending branch 10. Included in the upper section of the descending branch 10 is a cooler 11.

The whole volume of the stator 3, and the circulation system, are filled with a cooling fluid. A fluid with a high specific electric resistance and neutral with respect to the insulating and structural materials can be used as a coolant.

To compensate thermal expansion of the cooling fluid, it is expedient to employ any device known in the art and suitable for the case, an expansion tank 12 included.

According to one of the embodiments of the invention, the proposed electric machine is provided with a heater 13 incorporated into the ascending branch of the circulation system and intended for speeding up directed circulation when the machine is started. Any heating apparatus known in the art and sufficiently powerful can be employed as the heater 13; an electric heater is a preferable one.

It is essential that the heater 13 be located in the lower portion of the circulation system ascending branch, in immediate proximity to the stator 3, as is shown in the drawing.

To increase the efficiency of the circulation system, the ascending branch thereof and the adjacent part of the stator 3 are provided with thermal insulation.

The operation of the proposed electric machine, for instance a turbogenerator, is as follows.

It is common knowledge that modern power stations employ unit systems, therefore starting of the turbogenerator completely depends on the starting of the whole unit.

The starting process proceeds as follows. First, boiler plant is started, and then steam turbine. The cooler 11 is cut in some time prior to starting the turbine.

Since the cooling fluid in the whole volume of the circulation system had one and the same temperature, the specific weight thereof was also uniform, and, therefore, pressure in the chambers 7 and 8 was equal for it depends on specific weight of the cooling fluid and the height of the ascending and descending branches 9 and 10 relative to the body of the stator 3, in which case the fluid in the circulation system does not move. Once the cooler 11 is cut in, the fluid found in the volume thereof cools down and the cooled fluid descends down the descending branch 10, thereby forcing out the fluid having a higher temperature. As the temperature of the fluid in the descending branch 10 lowers, pressure in the chamber 8 increases. As a result there appears a pressure differential between the chambers 7 and 8 which causes the cooling fluid to flow from the chamber 8 into the chamber 7. As the flow rate of the cooling fluid through the ducts 6 of the stator reaches an estimated level (it is determined and controlled by the difference of temperatures of the cooling fluid in the ascending and descending branches 9 and 10 of the circulation system), the electric machine is started. Part of the heat liberated in the active parts of the stator 3 heats up the cooling fluid in the ducts 6 of the stator 3. The fluid heated in the ducts 6 moves through the chamber 7 along the ascending branch 9 of the circulation system, towards the cooler 11. The above-mentioned temperature gradient grows, as well as the pressure differential in the chambers, and, consequently, the flow rate through the ducts 6 of the stator increases. This is accompanied, however, by an increase of the portion of the heat which heats up the fluid in the ducts 6.

By gradually increasing the load of the electric machine, there is achieved an estimated normal performance of the whole system.

To speed up directed movement of the cooling fluid through the ducts 6 of the stator 3, it is expedient that the ascending branch 9 be provided with a heater 13. The heater 13 is cut in simultaneously with the cooler 11, thereby making it possible to reach the required difference of temperatures of the fluid in the ascending and descending branches 9 and 10 of the circulation system. The heater 13 is switched off as soon as the normal performance of the electric machine is set in. The heater 13 can also be used to ensure a reliable performance of the electric machine. In this case the heater, if necessary, can be cut in automatically, depending on the difference of temperatures of the cooling fluid in the ascending and descending branches. To obtain a maximum effect, it is expedient that the heater 13 be mounted in the lower section of the ascending branch, in the immediate proximity to the stator. The length of the pipe of the ascending branch 9 can reach 5–10 m, diameter 0.3–0.5 m, and the difference of temperatures of the pipe wall and the surrounding medium 50°–80° C. Heat exchange under these conditions is rather efficient and can cause the formation of secondary vortex in the fluid moving up the ascending branch 9. Said vortex increases hydraulic resistance to the moving fluid, which, in turn, results in a certain reduction of the efficiency loss of the system. Therefore, it is essential that the ascending branch 9 be provided with thermal insulation 14. Due to the same reason, it is advisable that part of the body of the stator 3, to which the ascending branch is adjacent, be also thermally insulated.

Through investigations of a similar system proved its high efficiency, stability and reliability in operation.

What is claimed is:

1. An electric machine having a rotor and a stator circumferentially thereof, enclosure means enclosing the electric machine having a compartment divided by the stator into two chambers each on an opposite side of the stator, a jacket extending circumferentially about the rotor isolating the stator thermally from the rotor, said stator having means defining ducts therethrough for flowing a cooling fluid from one chamber to the other through the ducts in the stator, means for effecting a pressure differential of the cooling fluid in the two chambers as a function of a temperature differential and density of the cooling fluid in the two chambers comprising means, defining an upward flow path for the cooling fluid above the level of said enclosure and in communication with one of said two chambers and a downward flow path for the cooling fluid above the level of the enclosure, in communication with the other chamber, and a cooler in a flow path between the upward and downward flow paths for selectively cooling the cooling fluid.

2. An electric machine according to claim 1, including a heater disposed to selectively heat the cooling fluid in the upward flow path and disposed in the vicinity of the enclosure at a lower part of the upward flow path.

3. An electric machine according to claim 1, in which the flow ducts in the stator extend from one chamber to the other chamber and extend axially through the stator.

* * * * *